United States Patent [19]

Carbine

[11] Patent Number: 5,253,255
[45] Date of Patent: Oct. 12, 1993

[54] SCAN MECHANISM FOR MONITORING THE STATE OF INTERNAL SIGNALS OF A VLSI MICROPROCESSOR CHIP

[75] Inventor: Adrian Carbine, Portland, Wash.

[73] Assignee: Intel Corporation, Santa Clara, Calif.

[21] Appl. No.: 612,401

[22] Filed: Nov. 2, 1990

[51] Int. Cl.[5] .................................. G01R 31/28
[52] U.S. Cl. ........................ 371/22.6; 371/22.3; 371/22.4; 371/29.1
[58] Field of Search ............ 371/15.1, 16.5, 22.1, 371/22.3, 22.4, 22.6, 29.1, 25.1; 395/575

[56] References Cited

U.S. PATENT DOCUMENTS

| | | | |
|---|---|---|---|
| 3,937,938 | 2/1976 | Matthews | 371/29.1 |
| 4,862,072 | 8/1989 | Harris et al. | 371/25.1 |
| 5,051,944 | 9/1991 | Fetterolf et al. | 395/575 |
| 5,121,489 | 6/1992 | Andrews | 395/375 |

*Primary Examiner*—Charles E. Atkinson
*Attorney, Agent, or Firm*—Owen L. Lamb

[57] ABSTRACT

A VLSI chip debug and production test apparatus that allows an engineer to view the state of hundreds of signals internal to a chip in real-time without probing, which greatly simplifies the isolation of circuit, speed, logic, and microcode bugs. For production testing, it also provides the ability to check the state of these internal signals on a clock-by-clock basis. The mechanism uses a gated XOR-input serial shift-register cell (10), which is stepped out underneath major buses in otherwise unpopulated areas of the chip. Several of these cell groups are linked together to form a scanout path of the desired length, the operation of which is controlled with a single input pin (40). Output data is channeled through a shared output pin (19) to a VLSI tester (16). In the tester (16) the data (19) is checked and accumulated by back-end software over multiple test-loop iterations, and formatted into a readable form.

8 Claims, 4 Drawing Sheets

SCAN MECHANISM FOR MONITORING THE STATE OF INTERNAL SIGNALS OF A VLSI MICROPROCESSOR CHIP

TECHNICAL FIELD

The present invention relates to data processing systems and more particularly, to a means for checking the operation of a very large scale integrated (VLSI) circuit chip.

BACKGROUND ART

One of the well-known problems presented by the increased device count and complexity of modern VLSI chips is the difficulty in getting them debugged and qualified for full production. Once the initial design is completed and A-step parts are obtained, engineers are faced with the necessity of fixing any circuit, logic, or microcode bugs, as well as improving the device operating frequency and test coverage. All too often these tasks are delegated to a small number of people from the original design team, many of whom may have moved on to other projects or other companies, or the tasks may be delegated to other people less familiar with the chip. Thus, the people charged with making the part into a saleable product may or may not have an in-depth understanding of the full chip and the complex interactions between its component units. Even for someone who has a thorough understanding of the device and knows where to look when isolating a particular problem, the lack of internal-state observables and the high cost of obtaining it only compounds the problem. Writing product validation (PV) tests can be very difficult for an engineer unfamiliar with a unit or the whole chip, since the state of each targeted node must be carefully propagated through unfamiliar territory to the pins where it can be observed. The process of fault grading is much less painful when important internal signals can be easily seen.

In the past, the problem of observing internal signals while debugging has been solved solely by probing or E-beam scanning. Both of these techniques are limited to unpassivated dice, are difficult for customer-returned packaged parts and are not time-efficient for those unfamiliar with the chip. Knowing where to start looking for a bug is half of the battle. More recently, much attention has been given to designed-in approaches to controllability and observables, such as scan-in/scan-out and linear-feedback shift registers (LFSRs), but these mechanisms have limitations.

Conventional scan logic introduces increased path delay and requires that the tested part be exercised at a reduced clock frequency while scanning.

Linear-feedback shift registers (LFSRs) in general use an algorithm to compress their input data into a more convenient representative signature, which can be compared with an expected value to detect the presence of errors in the input data. The cells of the register are representative of a binary polynomial P(x), since the output of the register is fed back to selected cell positions. Clocking the register effectively multiplies the polynomial representing the contents of the register by x and divides this by the feedback polynomial P(x); both operations are modulo-2. In practice this is implemented by shifting the register contents and feeding back the most-significant bit of the shift register, the quotient bit, to be XORed with the register contents in the bit cell positions determined by the coefficients of P(x). What remains in the register after all input bits are processed is the modulo-2 remainder of the modulo-2 division, called the signature. By carefully choosing the feedback polynomial, various levels of error detection may be obtained; however, a given implementation is able to detect only a limited number of erroneous bits that occur in certain patterns. All LFSRs have the potential of allowing errors to go undetected, if those errors happen to map to the same signature as the correct pattern.

LFSRs have the drawback that the process destroys all individual bit information and LSFRs are limited in error-detecting effectiveness by the choice of a particular feedback polynomial. This technique also requires test code to periodically compare the accumulated value of an internal signature with a stored predicted value to determine the presence or absence of errors. It does not pin point those errors to exact locations.

It is an object of the invention to provide an improved method and means for testing and debugging the internal components of a very large scale integrated (VLSI) circuit chip.

SUMMARY OF THE INVENTION

Briefly, the above objects are accomplished in accordance with the invention by providing a method of debugging the operation of an integrated circuit chip by first loading a shift register in parallel with data from internal test points thereby taking a snapshot of the internal state of a chip at a desired clock cycle. The data is then shifted out of the shift register serially, one bit per clock. The data is displayed in a useable form on a computer display. The process is repeated by looping back to the beginning of the test to take a snapshot one clock later than the previous test's capture point.

In accordance with an aspect of the invention, for testing (rather than debug), the parallel input vector is exclusive ORed with the previous contents of the shift register. The result is shifted by one bit position and then the output pin value is compared with the an Register Transfer Language (RTL) simulated value.

The invention has the advantage that in debug mode, the displayed output is analogous to the "view event" common to Register Transfer Language (RTL) simulators, in that hundreds of key internal signals may be seen in what appears to be real-time.

The invention has the advantage that this raw data can be formatted into a user-friendly form, such as hexadecimal representation, decoded fields, and disassembled instructions, and erroneous data can be highlighted and displayed with the correct value, to thereby provide a real-time view of hundreds of key internal signals without the need to probe.

The invention has the advantage that speed path, circuit, or logic errors are localized to a small area for ease in locating the source of the errors.

The invention has the advantage that circuit failures due to frequency, voltage, or temperature sensitivity can be observed to happen in the lab as these parameters are varied. Since the symptom will be seen on a particular signal or group of signals, the problem is effectively isolated to a group of hundreds of transistors rather than hundreds of thousands, and the failing circuit can more easily be located by standard means. Logic bugs can likewise be localized to a small area of the chip.

The invention has the advantage that bugs in microcode or cache-resident macrocode can be found by tracing internal instruction activity each clock cycle.

BRIEF DESCRIPTION OF THE DRAWINGS

The invention will be apparent from the following, more particular description of the preferred embodiment of the invention as illustrated in the accompanying drawings, wherein.

DESCRIPTION OF THE PREFERRED EMBODIMENT

Figure 1:
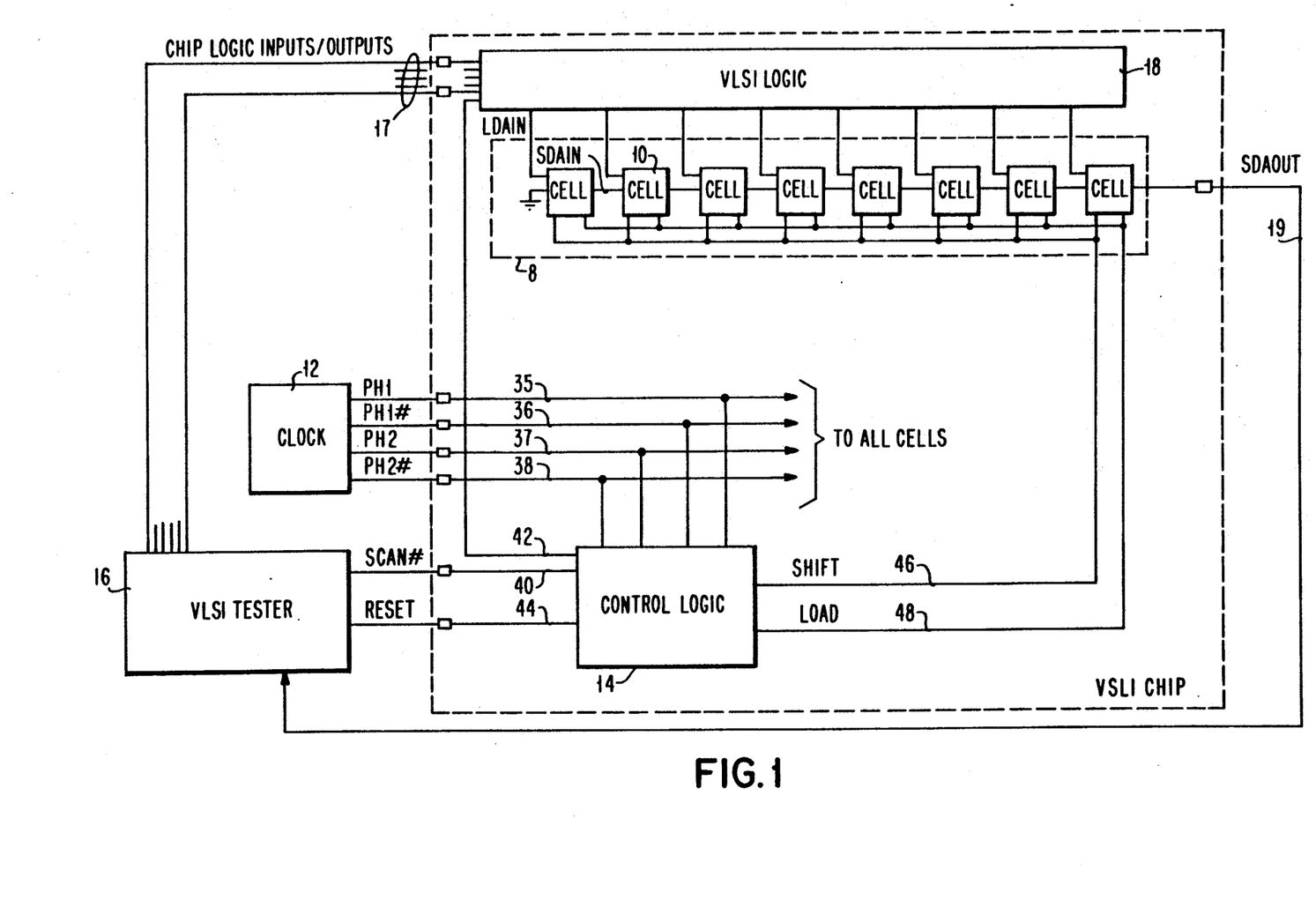
FIG. 1 is a diagram of a VLSI chip in which the present invention is embodied.

Refer to FIG. 1. Several hundred cells (10) are chained together to form a distributed shift register driven by a two-phase clock (12). Using a single input pin (40) to determine its mode of operation, the scanout control logic (14) asserts the two control lines SHIFT (46) and LOAD (48) to govern operation of all scanout cells (10) scattered throughout the VLSI chip.

The scanout section located in each section of the chip consists of a few groups of, for example, 10 to 20 cells routed in minimum metal: the two control signals (SHIFT and LOAD) and the one-bit serial data path shift in (SDAIN) for each cell or group of cells and shift out (SDAOUT) for each cell or group.

The parallel input signals from the VSLI chip logic (18) included in the scanout can be routed in silicide or metal1, as can any local interconnections. The individual groups of cells can fit in otherwise vacant holes in the layout, underneath major metal2-only busses, or in the central corridor areas. Four clock signals (35, 36, 37, 38) are used, cross-coupled and leading-edge-delayed, and driven locally for each chip.

The logic is selectable to operate in one of two modes, (1) production testing mode and (2) debug mode. In production testing mode, the state of all of the participating signals is compressed to an equivalent serial-bit stream and shifted out on line SDAOUT, one bit per clock cycle. The SDAOUT output pin (19) is compared in the VSLI tester (16), against the value expected by the microsimulator. Each participating signal is in effect seen at the pin (19). Product validation (PV) tests can be written with the assumption that errors on these signals will be directly visible by the tester during production sorting. With a fault-grading engine to provide feedback on the test coverage achieved, and the RTL simulator to verify correctness, the test writer can concentrate on the controllability aspect of the test. Improvements can be made to the existing test suite by just adding code to target specific transistors not already properly tested.

Figure 2:
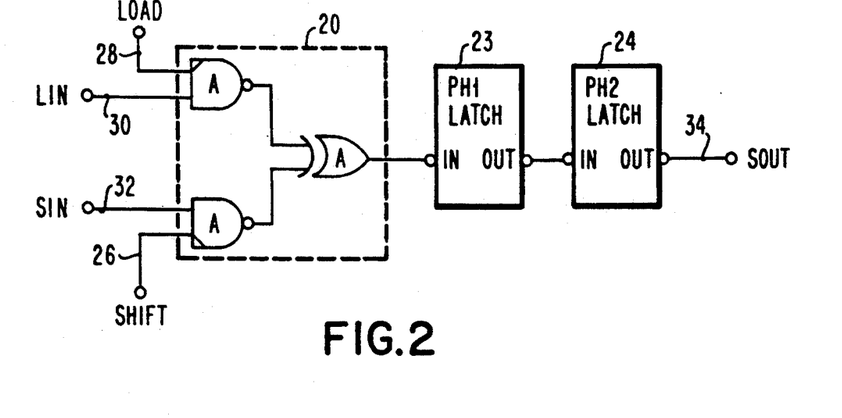
FIG. 2 is a diagram of a shift register cell used to implement the test mechanism shown in FIG. 1.

Refer now to FIG. 2 which is a diagram of a shift register cell (10) shown in FIG. 1. The basic cell (10) consists of a gated XOR (20) followed by two latches (22, 24) in a master/slave configuration. Two control signals, SHIFT (26) and LOAD (28), determine which of four possible operations is performed each clock cycle (1) clear the scanout register.
(2) load the scanout register in parallel;
(3) shift the scanout register serially; and,
(4) shift and load the scanout register while XORing the inputs.

Figure 4:
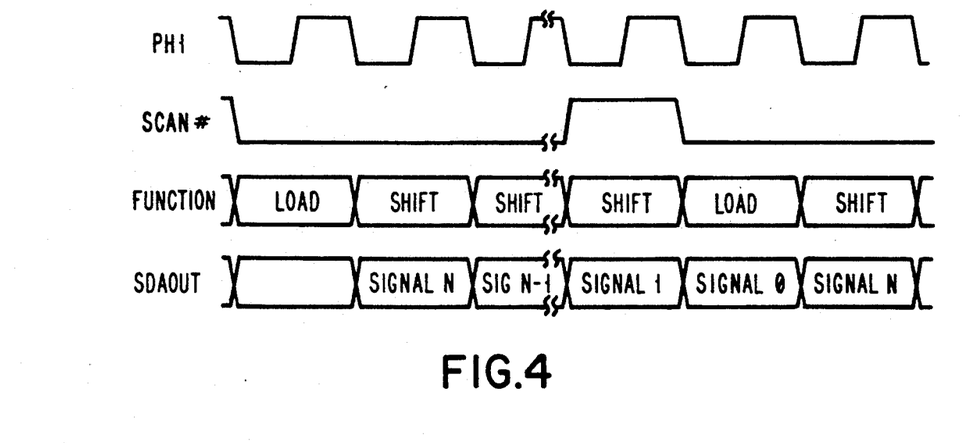
FIG. 4 is a timing diagram of the debug mode of operation.

Referring again to FIG. 1, the entire mechanism is controlled by an input pin, SCAN# (40), which determines whether the shift register performs a latch-then-scan function, as required by the debug mode, or whether it does a compression-and-shift on its parallel inputs, as needed by the production testing mode. As long as the SCAN# pin remains high, the mechanism remains in the latter mode. However, in the first clock cycle that SCAN# (40) is brought low, it loads a parallel input vector from the VLSI logic (18) into the shift register. In the next clock this captured data is shifted serially one bit position towards the output. This serial shift continues to happen during each subsequent clock cycle that the SCAN# pin is held low. In the first clock that SCAN# is brought high again, the register shifts one more time. This sequence can then be repeated as desired to take "snapshots" of the internal state at chosen points in time. Thus, to repetitively load-and-scan out the last 10 bits of the register, the sequence is to bring SCAN# low for nine clock cycles, return it high for one clock cycle, and repeat. This is shown in FIG. 4.

Operation is enabled by a test mode enable signal, ENABLE# (42), which originates in a test mode control register within the VLSI tester (16), so that the shift register remains cleared when not needed, in order to save power. It is also cleared by system reset signal (44).

In production test mode, the scanout relies on the VLSI tester (16), which exercises the chip over chip logic inputs (17), and compares the value of the output pin SDAOUT (19) against the value expected by the test vector, which is generated from the microsimulator. In debug mode the tester (16) simulates a free-running program loop, by driving input vectors to the input pins of the chip and examining the output pins of the chip in a repetitive manner. On each pass through the test sequence, a "snapshot" is taken of the chip's internal state by toggling the SCAN# pin (40), but this action is repeatedly delayed by one clock cycle on each pass through the test. Each series of bits thus obtained is accumulated in the tester pattern memory (16) as a 150-bit word representing the state of the machine at that point in time.

During the test, the chip clock signals generated by the clock (12) continue to operate at normal frequency, which allows speed-critical signals to be observed. At a clock frequency of 33 Mhz, the 150 participating signals can be loaded in parallel and shifted out in about 4.5 microseconds, and this can be repeated again one "test-loop period" later, until an entire screen-full of information is obtained. Depending on the length of the test loop and the overhead associated with checking and formatting the data, this is easily fast enough to meet screen refresh requirements and appear to be real-time to the human eye. In this way, the operator can adjust the supply voltage, for example, while watching the first erroneous bits appear at some cycle on the screen.

The scanout mechanism greatly accelerates the silicon debug effort common in early steppings of complex chips. It provides a quick view of the state of hundreds of chip-internal signals without probing, using a lab workstation to view the data. The value of the sampled state is displayed on a per-clock basis, much like a microsimulator's trace or view event format, showing assembler mnemonics, decoded fields, and hexadecimal representation of data. Depending on the speed of the tester, this information can be seen in what appears to be real-time. Circuit failures sensitive to frequency, voltage, or temperature variation can be observed to happen in the lab as these parameters are adjusted. For example, a high-voltage failure can be observed and investigated by increasing the power supply voltage until the scanout display shows a signal mismatch. This mismatching signal or bus indicates which logical block has the failure, and thus the probable bug location is effectively isolated to a group of a few hundred transistors. If further investigation is necessary, conventional silicon debug tools and techniques can be used to rapidly find the exact failure point.

The most important task in implementing scanout in a complex chip is in choosing which signals to sample. A good signal selection strategy is important in maximizing the benefit from the scanout mechanism during silicon debug and test, while minimizing the cost in die area. Each scanout cell contains 36 transistors, and the interconnect between cells consists of two control wires, one data wire, and clocks. Although much of the scanout chain can be efficiently tucked away in otherwise vacant areas of the layout, it is generally too expensive and impractical, from a layout point of view, to sample a vast number of signals. In addition, tests must be padded with a number of noop vectors equal to the number of sampled signals, to ensure that all scan data is shifted out at the end of a test.

The fundamental criterion used in choosing signals is the ability to effectively isolate groups of transistors. Four types of signals should be included: (1) Key top-level signals which help isolate failures to a major unit, (2) "who-done-it" signals that indicate which device drove a shared bus, (3) unit-internal signals and busses usually traced while debugging a unit's microsimulator model, and (4) signals that are difficult to observe for product validation (PV) testing. Other factors, including initializability, determinism, error independence, speed-criticalness, and ease of layout are also important in finalizing the list of sampled signals.

Top-Level Signals

Top-level (inter-unit) signals are effective in isolating silicon failures because they narrow the focus to specific units of the chip. That is, when a failure is seen at the output of a unit, but not at its pertinent inputs, the problem is effectively localized to a small area (5 to 10%) of the chip. In practice, it is most effective to include major inter-unit control signals and busses, since, in addition to isolating transistors, these yield valuable information about what the chip is doing internally. This information is difficult to see at the pins, and the chip could be executing code from internal caches or ROM, which would show little or no pin activity. In order to limit the number of signals in the scanout chain, full-width data busses are not included; PV test methodology dictates that this state already must be propagated to the pins, a task that is quite easy. It is sometimes useful to include just a few bits of wide control or data busses, however, in order to establish context while debugging.

"Who-done-it" Signals

These signals indicate which unit or logical block drove a globally-shared bus, such as a wired-or "Ready" signal or a tri-state data bus. For example, it is important to know that the "Ready" line was pulled low erroneously, but it is more useful to additionally know which unit did the pulling. Since such "who-done-it" signals are usually internal to each unit of the chip, they are probably not found in the list of inter-unit signals.

Unit RTL Debug Signals

A Register Transfer Language (RTL) simulator models a structure in machine code so that the structure can be simulated on a computer. Signals usually traced (the RTL trace) while debugging a unit's microsimulator are very effective in isolating bugs to a logical block within a particular unit. Like inter-unit signals, this group provides not only transistor isolation, but also information about what is happening inside the unit, which is valuable in understanding a failure mechanism.

Difficult-to-observe Signals

These signals are included because of the scanout's fault coverage role, and are outputs from logic that is difficult to validate by any other means. It is very important to be able to propagate errors to the pins during PV testing, and if this task is difficult, an easy solution is to include the offending signals in the scanout. Signals thus included can be thought of as reaching the pins directly, and the test writer only has to worry about exercising the logic properly.

Note that signals chosen for PV testing may or may not be on the list chosen for silicon debug. That is, signals chosen for production testing may be too arcane or special-purpose to be very useful for debug, unless a problem happens to arise in that particular block. On the other hand, signals chosen for debug purposes may be of little benefit in improving the fault grade of a chip, because they are easily propagated to the pins. This situation is unavoidable, given the dual purposes of the mechanism. In favor of including both types, however, it should be noted that getting signals easily to the pins is of no use during silicon debug, because the engineer may not have the luxury of changing a failing test in order to do so. In fact, changing the test in any way can often cause the failure to disappear. Most internal signals cannot be directly observed at the pins anyway.

To summarize the signal selection strategy, the following simple questions should be asked about a candidate scanout signal:

Does this signal effectively isolate a group of transistors?

Does this signal make silicon debug easier?

Does this signal improve unit fault coverage?

Other Selection Factors

Once a reasonably-sized group of signals is chosen for scanout, there are several other important factors to consider:

1. Every signal in the list must be initializable, and once it is initialized, it must operate in a predictable way. This is extremely important. If just one signal in the chain goes to an indeterminate state for one clock, the scanout data will miscompare during MOSSIM validation, production testing of silicon, and in functional redundancy checking (FRC) on the customer's board. As long as a signal reaches a deterministic state, from either a hardware reset or microcode initialization, it may be included in the scanout. Once all sampled signals are initialized, and the scanout chain is turned on, no uninitialized values can ever enter the chain. However, slip-ups in this category are not usually critical for A-step silicon, since the scanout chain is primarily used for debug at the first stepping, rather than for fault coverage. Compliance with this rule can be verified by a switch-level logic simulator.

2. Sampled signals should not be directly dependent on each other. Examples of this are delayed versions of the same signal, or a control signal for a MUX and the MUX output. Compliance with this rule reduces the chance of error cancellation in the scanout chain while it is operating in PV test mode. Usually this is not a difficult constraint, since the reduntant signal yields little new information, but if such signals are included, they must be positioned in such a way that an error in one cannot cancel the error from the other as it propagates down the chain. Like the previous rule, this is not as critical for A-step silicon.

3. Signals that are known speedpaths should not be directly sampled. Including a signal of this type may introduce a speedpath into the scanout, and could make the speedpath worse by adding more loading. Directly sampling the speed-critical signal doesn't really yield the desired information anyway. To correctly watch a speed-critical node using the scanout, the output of the latch it goes to should be sampled, or a signal that is derived from that output, rather than sampling the input to the critical latch. In this way, the critical circuit itself senses the lateness of the signal, and the scanout mechanism simply reports it.

4. As a practical matter, the design engineer must make sure that there is enough time in the schedule and enough area in the layout to place and route the scanout section for the proposed input signals. Marginally-useful signals that are difficult to get into the scanout chain should likely be dropped, while signals that are convenient to get into the scan layout, in terms of both signal routing and area availability, should be included.

THE USER INTERFACE

A software interface allows the scanout mechanism to be used efficiently as a silicon debug tool. After prompting the user for a starting vector number and the number of cycles to display, the program edits the input pattern memory on the VLSI tester in order to assert SCAN# control pin. The tester is then instructed to run the test, acquiring data from the SDAOUT# pin sequentially, one bit per cycle. Once the output data is read from the tester's pattern memory, it is converted to a readable format which includes assembler mnemonics, decoded register and branch fields, and hexadecimal representations of complex state information. Having captured and formatted one cycle's worth of data, the interface program increments the placement of the 148-cycle SCAN# pulse in the VLSI tester pattern memory, and the procedure is repeated until all the requested information has been obtained.

THE DEBUGGING PROCESS

The ability to conveniently examine hundreds of internal signals within a space of minutes greatly simplifies the task of determining the cause of failures due to frequency, voltage, or temperature sensitivities. The scanout procedure narrows the search to a small silicon area responsible for the error.

Once a particular test pattern is shown to fail on the VLSI tester, scanout "snapshots" are taken for several cycles surrounding the first failing vector, where external pins first showed errors. After adjusting parameters to make the test pass, another view is captured of the same test area. By simply comparing the two output files, it is possible to quickly identify the first cycle having an internal failure, and usually a very good description of how the failure occurred. This process is equivalent to micro-probing hundreds of signals for every cycle in question. For "hard" failures, such as fatal circuit problems and silicon-only logic errors, it is not possible to obtain a scan of the passing case for comparison, so the scanned data is instead compared against an RTL trace.

In production testing mode, the state of all participating signals is compressed to an equivalent serial bit stream and shifted out one bit per clock cycle, and the output pin is compared by the tester against the value expected by the microsimulator, just like any other pin on the chip. Each participating signal is in effect seen at the pins.

Figure 3:
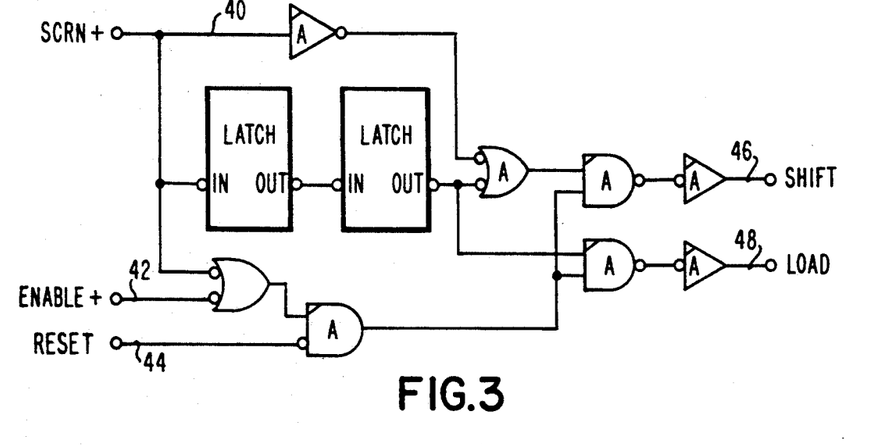
FIG. 3 is a diagram of a control circuit for controlling the logic shown in FIG. 1.
Figure 5:
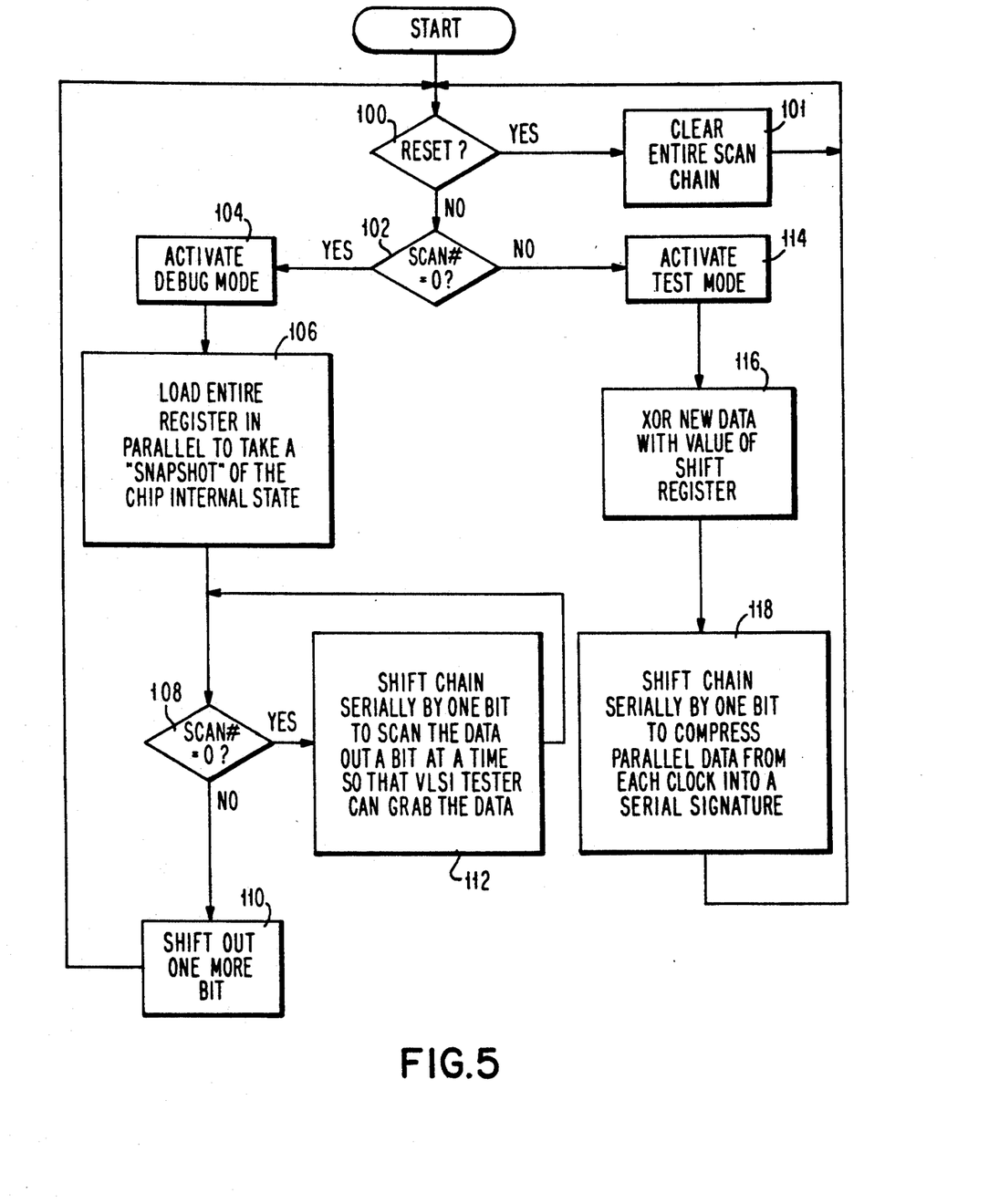
FIG. 5 is a flow chart of the operation of the scan mechanism.

Refer now to FIG. 5 which is a flow chart of the operation of the scan logic shown in FIG. 3. At the start of the operation a test is made to see if the SCAN# line is 0 or 1. If 0, the logic activates the debug mode (104). If 1, the logic activates the test mode (114). In debug mode the register is loaded in parallel to take a "snapshot" of the chip internal state (106). As long as SCAN# is 0 the captured data is shifted by one bit per clock to scan the data out one bit at a time so that the VLSI tester (16) can grab the data (112) at the output pin. As soon as the SCAN# line is a 1 again, the chain is shifted one more bit and the debug mode is ended.

Figure 6:
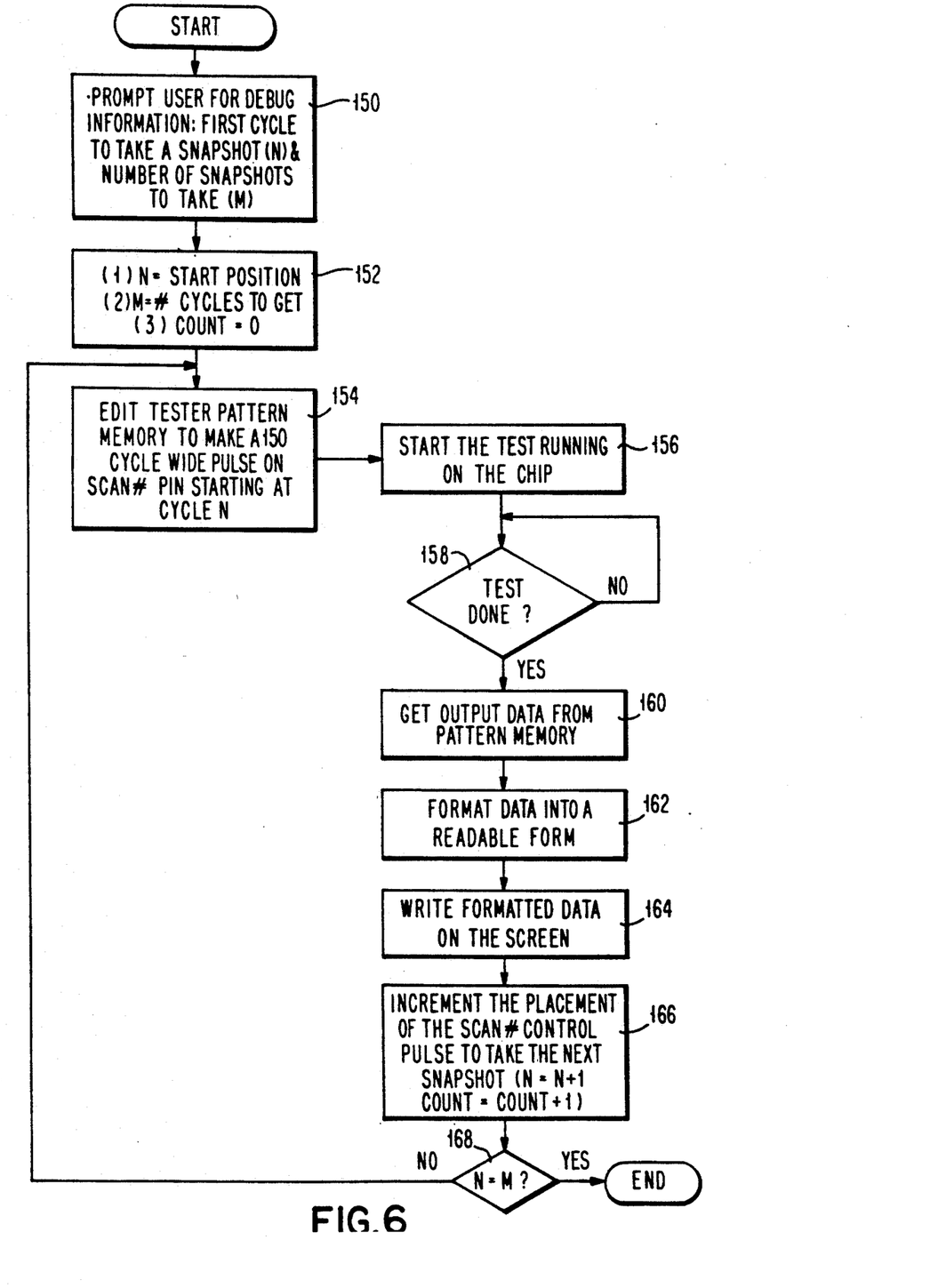
FIG. 6 is a flow chart of the VLSI tester/scanout operation in debug mode.

Refer now to FIG. 6 which is a flow chart of the VLSI tester/scanout operation in debug mode. At block (150), the tester prompts the user for debug information, the first cycle at which to take the "snapshot" and the number of snapshots to take.

The VLSI tester pattern memory is edited (154) to produce a 148 cycle pulse on the SCAN# pin. The VLSI tester operates (156) to stimulate the chip logic with test vectors and receives data for comparison with expected results. The scan output data is saved one bit per clock in the tester pattern memory (160). The user interface software formats the data in a readable form (162), including decoding mnemonics, symbols, hexadecimal, etc. The formatted data is then written on the tester screen (164). Finally the placement of the SCAN# control pulse is incremented (166) to take the next snapshot and the test is run again. When n=m (168) the number of snapshots specified in block (150) have been taken and the operation ends.

Refer now to FIG. 4 which is a timing diagram of the debug mode of operation. The control pin is asserted low to start the debug mode. The data is shifted out serially, one bit per clock, while the chip continues the test at full frequency. When all bits are out, they are displayed in a useable form and the test loops back to the beginning of the test.

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus for testing the operation of an integrated circuit chip, said chip having internal test points which produce parallel data, comprising:
   shift register means (8) for taking a snapshot of an internal state of said integrated circuit chip at a desired clock cycle by loading said shift register in parallel with said parallel data from said internal test points;
   said shift register having a serial output (19);
   control logic means (14) connected to said shift register means (8) for shifting said data out of said shift register serially at said serial output (19), one bit per clock cycle; and,
   tester means (16) connected to said serial output (19) of said shift register means (8) for displaying said data in a useable form on a computer display;
   said tester means including a SCAN# signal means (40) connected to said control logic means (14) for placing said control logic (14) in a debug mode or a production testing mode, depending upon the state of said SCAN# signal means (40).

2. The combination in accordance with claim 1 wherein:
   said tester means (16) includes means for exercising said chip with a simulated input (17),
   said shift register means (8) includes means (20) for exclusive OR-ing said parallel data with a previous contents of said shift register to thereby produce a result;
   said control means (14) includes means (46) for shifting said result by one bit position of said shift register; and,
   said tester means (16) includes means for comparing said serial output (19) with said simulated input (17).

3. The method of testing the operation of logic on an integrated circuit chip in either a debug mode or a test mode depending upon the state of a SCAN# signal being in a first state or a second state, respectively, said chip having internal test points which produce parallel data, comprising the steps of:
   (a) placing said SCAN# signal in said first state to activate said debug mode;
   (b) taking a first snapshot of a first internal state of said chip at a first clock cycle by loading a shift register in parallel with said parallel data from said internal test points at a first clock cycle capture point;
   (c) shifting said data out of said shift register serially at a serial output of said shift register, one bit per clock cycle;
   (d) displaying said data in a useable form on a computer display;
   (e) taking a second snapshot of a second internal state of said chip at a second clock cycle, said second clock cycle being one clock cycle later than said first clock cycle capture point.

4. The method of testing the operation of logic on an integrated circuit chip in either a debug mode or a test mode depending upon the state of a SCAN# signal being in a first state or a second state, respectively, said chip having internal test points which produce parallel data, comprising the steps of:
   (a) placing said SCAN# signal in said first state to activate said debug mode;
   (b) taking a first snapshot of a first internal state of said chip at a first clock cycle by loading a shift register in parallel with said parallel data from said internal test points at a first clock cycle capture point;
   (c) shifting said data out of said shift register serially at a serial output of said shift register, one bit per clock cycle;
   (d) displaying said data in a useable form on a computer display;
   (e) taking a second snapshot of a second internal state of said chip at a second clock cycle, said second clock cycle being one clock cycle later than said first clock cycle capture point;
   (f) placing said SCAN# signal in said second state to activate said test mode;
   (g) exercising said logic with a simulated input;
   (h) exclusive ORing said parallel data with a previous contents of said shift register;
   (i) shifting said result by one bit position; and,
   (j) comparing said output with said simulated input.

5. The method of testing the operation of an integrated circuit chip in a debug mode or a production testing mode, said chip having internal test points which produce parallel data, comprising the steps of:
   (a) asserting a SCAN# (40) input low, which determines whether a shift register performs a latch-then-scan function, as required by said debug mode, or whether it does a compression-and-shift on parallel inputs to said shift register, as needed by said production testing mode;
   (b) loading said parallel data into said register in a first clock cycle subsequent to said SCAN# being asserted low to thereby capture first parallel data in said shift register;
   (c) shifting said first parallel data serially one bit position towards a serial output of said shift register in a next clock cycle;
   (d) repeating step (d) during each subsequent clock cycle that said SCAN# signal input is held asserted low;
   (e) shifting said register one more time in the first clock cycle that SCAN# is asserted high again; and,
   (f) repeating steps (a) through (e) at chosen successive points in time.

6. The method in accordance with claim 5 comprising the further step of:
   (h) assembling each series of bits obtained into a parallel word representing a state of said chip at a particular point in time.

7. An apparatus for testing the operation of an integrated circuit chip, said chip having internal test points which produce parallel data, comprising:
   a shift register (8) for taking a snapshot of an internal state of said integrated circuit chip at a desired clock cycle by loading said shift register in parallel with said parallel data from said internal test points;
   said shift register having a serial output (19);
   a control logic (14) connected to said shift register (8) for shifting said data out of said shift register serially at said serial output (19), one bit per clock cycle; and, a tester (16) connected to said serial output (19) of said shift register (8) for displaying said data in a useable form on a computer display;

said tester including a SCAN# signal (40) connected to said control logic (14) for placing said control logic (14) in a debug mode or a production testing mode, depending upon the state of said SCAN# signal (40).

8. The combination in accordance with claim 7 wherein:

said tester (16) includes a first circuit for exercising said chip with a simulated input (17), said shift register (8) includes a second circuit (20) for exclusive OR-ing said parallel data with a previous contents of said shift register to thereby produce a result;

said control logic (14) includes a third circuit (46) for shifting said result by one bit position of said shift register; and, said tester (16) includes a comparison circuit for comparing said serial output (19) with said simulated input (17).

* * * * *